(12) United States Patent
Han et al.

(10) Patent No.: US 12,549,862 B2
(45) Date of Patent: Feb. 10, 2026

(54) IMAGE PROCESSING APPARATUS INCLUDING LINE INTERLEAVING CONTROLLER AND OPERATING METHOD THEREOF

(71) Applicant: SAMSUNG ELECTRONICS CO., LTD., Suwon-si (KR)

(72) Inventors: Hosuk Han, Suwon-si (KR); Sookyung Joo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 192 days.

(21) Appl. No.: 18/386,836

(22) Filed: Nov. 3, 2023

(65) Prior Publication Data

US 2024/0163571 A1 May 16, 2024

(30) Foreign Application Priority Data

Nov. 14, 2022 (KR) .................. 10-2022-0151987

(51) Int. Cl.
*H04N 23/80* (2023.01)
*G06F 12/02* (2006.01)
(Continued)

(52) U.S. Cl.
CPC .......... *H04N 23/80* (2023.01); *G06F 12/023* (2013.01); *G06T 1/20* (2013.01); *G06T 1/60* (2013.01); *H04N 1/40* (2013.01); *H04N 1/4092* (2013.01)

(58) Field of Classification Search
None
See application file for complete search history.

(56) References Cited

U.S. PATENT DOCUMENTS 5,526,050 A 6/1996 King et al.
5,953,020 A 9/1999 Wang et al.
(Continued)

FOREIGN PATENT DOCUMENTS

KR 10-2018-0092437 A 8/2018
WO 98/19450 A2 5/1998
WO 01/69919 A1 9/2001

OTHER PUBLICATIONS

Communication dated Mar. 18, 2024, issued by the European Patent Office in counterpart European Application No. 23209514.1.

*Primary Examiner* — Haris Sabah
(74) *Attorney, Agent, or Firm* — Sughrue Mion, PLLC

(57) ABSTRACT

An image processing apparatus and an operating method thereof are provided. The image processing apparatus includes: a line interleaving controller configured to generate output data based on line data received from channels respectively connected to image sensors; and an image signal processor configured to process the output data. The line interleaving controller includes: data packing circuits respectively corresponding to the channels and configured to generate packing data by packing the line data to a preset data size; a memory configured to store the packing data in a region indicated by an index assigned to a corresponding channel; a write controller configured to control a write operation of the memory; a line index controller configured to manage indexes respectively corresponding to the channels; a read controller configured to control a read operation of the memory; and an unpacking circuit configured to unpack read data output from the read controller.

20 Claims, 14 Drawing Sheets

(51) Int. Cl.
*G06T 1/20* (2006.01)
*G06T 1/60* (2006.01)
H04N 1/40 (2006.01)
H04N 1/409 (2006.01)

(56) References Cited

U.S. PATENT DOCUMENTS

| | | | |
|---|---|---|---|
| 6,044,225 | A | 3/2000 | Spencer et al. |
| 7,034,819 | B2 | 4/2006 | Lee et al. |
| 8,360,961 | B2 * | 1/2013 | Jung ............... A61B 1/041 |
| | | | 600/109 |
| 10,362,267 | B2 | 7/2019 | Cha et al. |
| 10,824,370 | B2 | 11/2020 | Drego et al. |
| 2009/0238198 | A1 | 9/2009 | Niu et al. |
| 2010/0177585 | A1 | 7/2010 | Rubinstein et al. |
| 2011/0242342 | A1 | 10/2011 | Goma et al. |
| 2011/0242355 | A1 | 10/2011 | Goma et al. |
| 2012/0062845 | A1 * | 3/2012 | Davis ............... H04N 23/73 |
| | | | 352/219 |
| 2014/0365705 | A1 * | 12/2014 | Tanaka ............ G06F 13/362 |
| | | | 710/308 |
| 2017/0343392 | A1 | 11/2017 | Ramasubramanian et al. |
| 2018/0227541 | A1 * | 8/2018 | Cha ................. H04N 23/45 |

* cited by examiner

IMAGE PROCESSING APPARATUS INCLUDING LINE INTERLEAVING CONTROLLER AND OPERATING METHOD THEREOF

CROSS-REFERENCE TO RELATED APPLICATION

This application claims priority to Korean Patent Application No. 10-2022-0151987, filed on Nov. 14, 2022, in the Korean Intellectual Property Office, the disclosure of which is incorporated by reference herein in its entirety.

BACKGROUND

The present disclosure relates to an image processing apparatus, and more particularly, to an image processing apparatus including a line interleaving controller that processes line data received through each of a plurality of channels.

With the development of mobile devices such as smartphones and tablet personal computers (PCs), electronic devices that each include a plurality of image sensors are widely used. An image processing apparatus may include an image signal processor that processes input images generated by a plurality of image sensors.

In order to process a plurality of input images provided through a plurality of channels by one image signal processor, the image signal processor may use a time-division multiplexing (TDM) method.

SUMMARY

One or more embodiments provide an image processing apparatus including a line interleaving controller capable of increasing internal memory efficiency and an operating method of the image processing apparatus.

According to an aspect of an embodiment, an image processing apparatus includes: a line interleaving controller configured to generate output data based on line data received from a plurality of channels respectively connected to a plurality of image sensors; and an image signal processor configured to process the output data. The line interleaving controller includes: a plurality of data packing circuits respectively corresponding to the plurality of channels and configured to generate packing data by packing the line data to a preset data size; a memory configured to store the packing data in a region indicated by an index assigned to a corresponding channel; a write controller configured to control a write operation of the memory; a line index controller configured to manage indexes respectively corresponding to the plurality of channels; a read controller configured to control a read operation of the memory; and an unpacking circuit configured to unpack read data output from the read controller.

According to an aspect of an embodiment, an image processing apparatus includes: a first data packing circuit configured to generate first packing data by packing first line data corresponding to a first channel to a preset data size; a second data packing circuit configured to generate second packing data by packing second line data corresponding to a second channel to the preset data size; an arbitration circuit configured to receive the first packing data and the second packing data and sequentially output the first packing data and the second packing data; a memory configured to store the first packing data and the second packing data; a line index controller configured to manage a first index for a first region in the memory in which the first packing data is stored and manage a second index for a second region in the memory in which the second packing data is stored; a write controller configured to control a write operation of the memory; a read controller configured to control a read operation of the memory; and an unpacking circuit configured to generate output data by unpacking the read data output from the read controller.

According to an aspect of an embodiment, an operating method of an image processing apparatus including a line interleaving controller, includes: generating packing data by packing line data received through each of a plurality of channels to a preset data size; assigning indexes respectively corresponding the plurality of channels, and writing the packing data to a memory of the line interleaving controller based on addresses included in the assigned indexes; reading packing data corresponding to a channel from which line data input is completed from the memory, based on indexes assigned to the channel from which the line data input is completed; and generating output data by unpacking read data read from the memory.

BRIEF DESCRIPTION OF DRAWINGS

The above and other objects and features will be more clearly understood from the following description, taken in conjunction with the accompanying drawings, in which.

DETAILED DESCRIPTION

Figure 1:
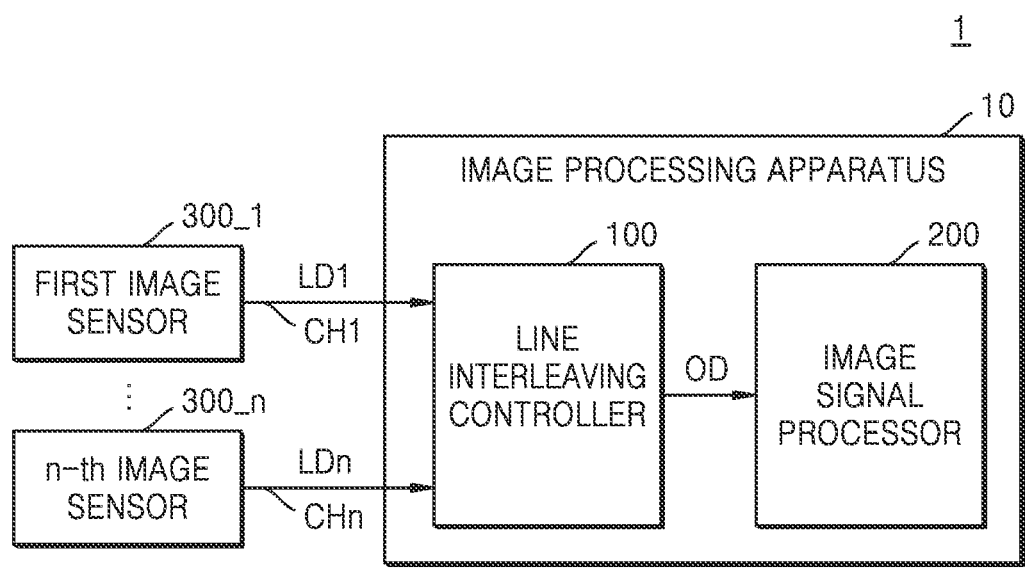
FIG. 1 is a block diagram illustrating an image processing system according to an embodiment.

Hereinafter, embodiments will be described in detail with reference to the accompanying drawings. The same reference numerals are used for the same components in the drawings, and redundant descriptions thereof are omitted. Each embodiment provided in the following description is not excluded from being associated with one or more features of another example or another embodiment also provided herein or not provided herein but consistent with the present disclosure. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

As used herein, the term "circuit" refers to software or a hardware component, such as a field programmable gate array (FPGA) or an application specific integrated circuit (ASIC), and the "circuit" performs certain operations. However, a "circuit" is not limited to software or hardware. A "circuit" may be configured to be included in an addressable storage medium and may also be configured to reproduce one or more processors. Accordingly, a "circuit" includes, for example, components, such as software components, object-oriented software components, class components, or task components and may include processes, functions, properties, procedures, subroutines, segments of program codes, drivers, firmware, micro-codes, circuitry, data, databases, data structures, tables, arrays, or variables.

FIG. 1 is a block diagram illustrating an image processing system 1 according to an embodiment.

The image processing system 1 may be implemented as an electronic device that captures an image, displays the captured image, or performs operation based on the captured image. The image processing system 1 may be implemented by, for example, a personal computer (PC), an Internet of things (IoT) device, or a portable electronic device. The portable electronic device may include a laptop computer, a mobile phone, a smartphone, a tablet PC, a personal digital assistant (PDA), an enterprise digital assistants (EDA), a digital still camera, a digital video camera, an audio device, a portable multimedia player (PMP), a personal navigation device (PND), a moving picture experts group (MPEG) audio layer-3 (MP3) player, a handheld game console, an electronic book (e-book), a wearable device, or other electronic device. In addition, the image processing system 1 may be built in an electronic device, such as a drone or an advanced driver assistance system (ADAS), or an electronic device provided as a component of a vehicle, furniture, a manufacturing facility, a door, and various measurement devices.

Referring to FIG. 1, the image processing system 1 may include a plurality of image sensors (for example, a first image sensor 300_1 to an n-th image sensor 300_n, where n is a natural number greater than or equal to 2), and an image processing apparatus 10. The image processing system 1 may further include other components, such as a display and a user interface. The image processing apparatus 10 or the image processing system 1 may be implemented as a system on chip (SoC). In an embodiment, the image processing system 1 or the image processing apparatus 10 may include an application processor (AP).

Each of the first image sensor 300_1 to the n-th image sensor 300_n may be implemented by an image sensor chip or a camera module. Each of the first image sensor 300_1 to the n-th image sensor 300_n may convert an optical signal reflected from or emitted by an object into an electrical signal, and generate and output image data based on the electrical signals.

For example, each of the first image sensor 300_1 to the n-th image sensor 300_n may include a pixel array including a plurality of two-dimensionally arranged unit pixels, and a correlated double sampler that samples an electrical signal generated by the pixel array from an optical signal, an analog-to-digital converter that converts an analog signal provided from the correlated double sampler into a digital signal and outputs the digital signal, a latch that outputs the digital signal, a signal processing unit, and so on. Each of the first image sensor 300_1 to the n-th image sensor 300_n may transmit image data through an interface, such as a mobile industry processor interface (MIPI) or a camera serial interface (CSI).

In an embodiment, one of the first image sensor 300_1 to the n-th image sensor 300_n may be a vertical-type depth sensor that extracts depth information by using, for example, infrared (IR) rays. In this case, the image processing apparatus 10 may generate a three-dimensional (3D) depth image by merging an image data value provided from the depth sensor and an image data value provided from another image sensor.

In an embodiment, at least two of the first image sensor 300_1 to the n-th image sensor 300_n may have different fields of view. In this case, for example, optical lenses of the at least two image sensors may be different from each other but embodiments are not limited thereto.

The image processing apparatus 10 may include a line interleaving controller 100 and an image signal processor 200. In an embodiment, the line interleaving controller 100 and the image sensor processor 200 may be included in an AP.

The line interleaving controller 100 may receive first image data from the first image sensor 300_1 and may receive n-th data from the n-th image sensor 300_n. For example, the first image data may be divided into units of line data, and the line interleaving controller 100 may receive first line data LD1 from the first image sensor 300_1 through a first channel CHL In addition, for example, the n-th image data may be divided into units of line data, and the line interleaving controller 100 may receive n-th line data LDn from the n-th image sensor 300_n through an n-th channel CHn.

The line interleaving controller 100 may perform time-division multiplexing (TDM) in units of line data instead of units of frame data. The line interleaving controller 100 may transmit output data OD to the image signal processor 200 as a result of performing the TDM. The line interleaving controller 100 according to embodiments may perform a first-finish first-out interleaving operation of preferentially outputting image data corresponding to a channel from which image data input has been completed first among the first image data to the n-th image data, without performing an interleaving operation of a first-in first-out method of first outputting the first input data among the first line data LD1 to the n-th line data LDn provided through the first channel CH1 to the n-th channel CHn. Accordingly, the line interleaving controller 100 may be implemented to efficiently use the capacity of a memory therein and include a memory with a relatively small capacity.

The image signal processor 200 may process image data received from each of the first image sensor 300_1 to the n-th image sensor 300_n. The image signal processor 200 may process in real time (on-the-fly) image data output from the first image sensor 300_1 to the n-th image sensor 300_n in units of line data by using a TDM method. In an embodiment, the image signal processor 200 may include a plurality of cores but embodiments are not limited thereto.

For example, the image signal processor 200 may reduce noise of the image data received from each of the first image sensor 300_1 to the n-th image sensor 300_n and may perform image signal processing for improving image quality, such as gamma correction, color filter array interpolation, color matrix, color correction, and color enhancement. In addition, the image signal processor 200 may generate an image file by compressing image data generated by image signal processing for improving image quality or may recover image data from the image file.

The image signal processor 200 may perform operation of converting image data into full image data, including red, green, and blue colors, in addition to the image processing operation described above. In addition, the signal processing unit 210 may perform pre-processing, such as crosstalk correction and a despeckle operation, for image data IDT and may further perform post-processing, such as a sharpening operation for the full image data. In addition, for example, the image signal processor 200 may further perform automatic dark level compensation (ADLC), bad pixel correction, and lens shading correction for the image data IDT.

Figure 2:
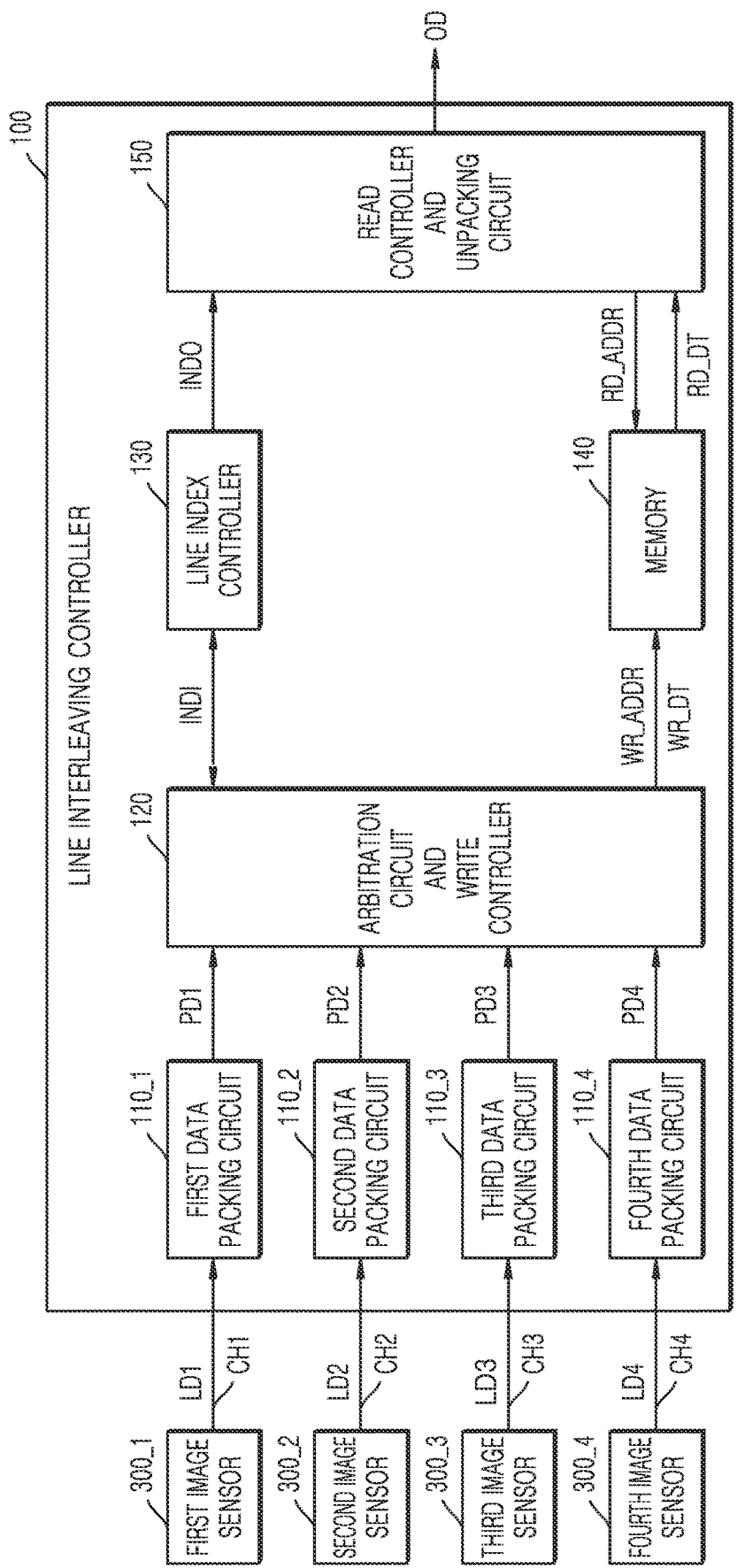
FIG. 2 is a block diagram illustrating a line interleaving controller included in an image processing apparatus according to an embodiment.

FIG. 2 is a block diagram illustrating a line interleaving controller 100 included in an image processing apparatus according to an embodiment. FIG. 2 illustrates an example in which the image processing apparatus 10 of FIG. 1 receives image data from four (that is, n=4) image sensors, but the line interleaving controller according to embodiments is not limited thereto, and n may have various values, including 2, 3, 5, or an integer greater than 5.

Referring to FIG. 2, the line interleaving controller 100 may include a plurality of data packing circuits (for example, a first data packing circuit 110_1 to a fourth data packing circuit 110_4), an arbitration circuit and write controller 120, a line index controller 130, a memory 140, and a read controller and unpacking circuit 150. The line interleaving controller 100 may receive the first line data LD1 to the fourth line data LD4 respectively from the first image sensor 300_1 to the fourth image sensor 300_4 respectively through the first channel CH1 to the fourth channel CH4.

The first data packing circuit 110_1 may receive the first line data DL1 from the first channel CH1 and generate first packing data PD1 by packing the first line data DL1 to a preset data size. The second data packing circuit 110_2 may receive the second line data DL2 from the second channel CH2 and generate second packing data PD2 by packing the second line data DL2 to the preset data size. The third data packing circuit 110_3 may receive the third line data DL3 from the third channel CH3 and generate third packing data PD3 by packing the third line data DL3 to the preset data size. The fourth data packing circuit 110_4 may receive the fourth line data DL4 from the fourth channel CH4 and generate fourth packing data PD4 by packing the fourth line data DL4 to the preset data size.

In an embodiment, the preset data size of the packing data, which is a unit of packing of a packing operation, may be determined by at least one of the number of channels connected to the line interleaving controller 100, the number of maximum bits received during one cycle of a clock signal for line data received from a plurality of channels, and pixels per cycle (PPC) of a clock signal for line data. For example, the data size of the packing data may be determined by multiplying the number of channels connected to the line interleaving controller 100, the number of maximum bits received during one cycle of a clock signal for different line data received from each of the plurality of channels, and pixels per cycle of a clock signal for line data by each other. For example, the data size of the packing data may be determined by the line interleaving controller 100 and set as the preset data size of the packing data.

Alternatively, in an embodiment, the data size of the packing data may be optimized by reducing the data size of the packing data by predicting a worst case scenario. For example, even when the number of channels connected to the line interleaving controller 100 is 8 and the number of maximum bits is 16 bits and 8 PPC, the data size of the packing data may be determined according to the number (for example, 4) of channels simultaneously providing image data, the number of maximum bits (for example, 12 bits), and 8 PPC according to the worst operation conditions.

The arbitration circuit and write controller 120 may include an arbitration circuit that receives the first packing data PD1 to the fourth packing data PD4 respectively from the first data packing circuit 110_1 to the fourth data packing circuit 110_4 and sequentially outputs the first packing data PD1 to the fourth packing data PD4 as packing data, and a write controller that controls a write operation of the memory 140. Because the arbitration circuit arbitrates the first packing data PD1 to the fourth packing data PD4 that are packed data, even when any data of the first packing data PD1 to the fourth packing data PD4 is selected and output as the packing data, the selected data may be output only once per at least 4 cycles of a clock signal. That is, even when the first line data LD1 to the fourth line data LD4 are continuously received from the first channel CH1 to the fourth channel CH4, the arbitration circuit may arbitrate the first packing data PD1 to the fourth packing data PD4 even when the first packing data PD1 to the fourth packing data PD4 are not stored separately.

The write controller may receive packing data from the arbitration circuit and store the packing data in the memory 140. The write controller may assign an index according to a channel corresponding to the packing data and may transmit index information INDI according to the assigned index to the line index controller 130. The write controller may convert the assigned index into a plurality of write addresses WR_ADDR and transmit the packing data to the memory 140 as write data WR_DT. Accordingly, the first packing data PD1 to the fourth packing data PD4 may be sequentially provided to the memory 140 as the write data WR_DT. In an embodiment, a data size corresponding to one index may be a multiple of the data size of the packing data, for example, 8 times or 16 times.

The line index controller 130 may manage indexes respectively corresponding to a plurality of channels, that is, the first channel CH1 to the fourth channel CH4. For example, the line index controller 130 may include first to fourth memories storing multiple pieces of index information respectively corresponding to the first channel CH1 to the fourth channel CH4, and the line index controller 130 may store the index information INDI in a corresponding memory among the first to fourth memories according to the index information INDI received from the arbitration circuit and write controller 120.

In addition, the line index controller 130 may provide index information INDO about indexes to be read to the read controller and unpacking circuit 150 to read data from the memory 140. That is, the line index controller 130 may provide the index information INDO about an index corresponding to a channel from which image data input is completed among the first channel CH1 to the to fourth channel CH4 to the read controller and unpacking circuit 150.

The memory 140 may include, for example, Static Random Access Memory (SRAM). However, embodiments are not limited thereto and the memory 140 may include another memory. The memory 140 may store (write) packing data in a memory region indicated by an assigned index according to the write address WR_ADDR and the write data DT provided from the arbitration circuit and write controller 120.

In addition, the memory 140 may output (read) read data RD_DT according to a read address RD_ADDR provided from the read controller and unpacking circuit 150. The read addresses RD_ADDR may correspond to a certain index, and packing data of a channel corresponding to the certain index may be read as read data RD_DT. The write operation and the read operation of the memory 140 are described below with reference to FIGS. 6 and 8.

The read controller and unpacking circuit 150 may include a read controller that controls a read operation of the memory 140 and an unpacking circuit that outputs output data OD by unpacking read data output from the read controller. The unpacking circuit may unpack the output data OD to have the same data format as each of the first line data LD1 to the fourth line data LD4.

The read controller may provide the read address RD_ADDR to the memory 140 and may receive the read data RD_DT from the memory 140. The read controller may receive the index information INDO about an index corresponding to a channel to be read from the line index controller 130, that is, a channel from which image data input is completed among the first channel CH1 to the fourth channel CH4, and may generate the read address RD_ADDR based on the index information INDO. Therefore, the read controller may read the read data RD_DT from a channel from which image data input is completed first among the first channel CH1 to the fourth channel CH4 based on the index information INDO without reading the read data RD_DT from the memory 140 in the order in which the first line data LD1 to the fourth line data LD4 provided through the first channel CH1 to the fourth channel CH4 are input.

The line interleaving controller 100 according to embodiments may output output data OD in an order that is different than the order in which the first line data LD1 to the n-th line data LDn provided through the first channel CH1 to the n-th channel CH4 are input. In a comparative example, a line interleaving controller that performs an interleaving operation in a FIFO manner may include a memory in which the second line data LD2 is stored until the first line data LD1 of the first image sensor 300_1 is output as output data when the first line data LD1 is first received from the first image sensor 300_1, even when the amount of the second line data LD2 provided from the second image sensor 300_2 is great, in a case in which a speed of the first image sensor 300_1 is relatively slow and a speed of the second image sensor 300_2 is relatively fast. This causes a problem that throughput of the line interleaving controller according to the comparative example is reduced and the memory becomes full.

In addition, the line interleaving controller 100 according to embodiments may perform a first-finish first-out interleaving operation of preferentially outputting image data corresponding to a channel from which image data input is completed first among first image data to fourth image data without performing an interleaving operation of a FIFO method. Accordingly, the throughput of the line interleaving controller 100 may be increased and the memory 140 may be efficiently used.

Figure 3:
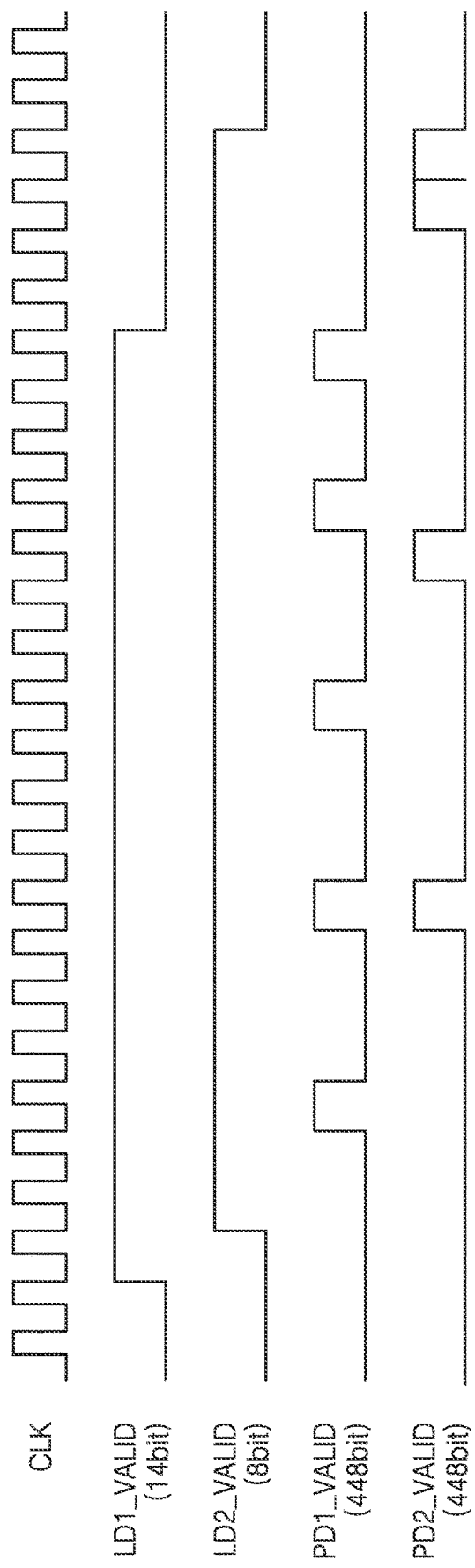
FIG. 3 is a diagram illustrating operation of a data packing circuit of a line interleaving controller according to an embodiment.

FIG. 3 is a diagram illustrating operation of a data packing circuit of a line interleaving controller according to an embodiment. FIG. 3 illustrates, for example, a case in which the first line data LD1 and the second line data LD2 are respectively received through the first channel CH1 and the second channel CH2.

Referring to FIGS. 2 and 3, a clock signal CLK may toggle to have a certain cycle. The first line data LD1 and the second line data LD2 may be provided depending on cycles of the clock signal CLK. For example, during one cycle of the clock signal CLK, first line data LD1 having a data size of 14 bits may be provided, and second line data LD2 having a data size of 8 bits may be provided.

The first line data LD1 may be provided to the line interleaving controller 100 in a valid period LD1_VALID of the first line data LD1, and the second line data LD2 may be provided to the line interleaving controller 100 in a valid period LD2_VALID of the second line data LD2. The first line data LD1 may start to be provided to the line interleaving controller 100 earlier than the second line data LD2.

In an embodiment, a data size of the packing data may be determined by multiplying the number (4) of channels connected to the line interleaving controller 100, the number (14) of maximum bits of different line data received from a plurality of channels during one cycle of a clock signal, and pixels per cycle (8) of a clock signal for the line data by each other. The data size of packing data may be 448 bits. This is an example and the data size of the packing data may be adjusted.

For example, the first line data LD1 may be packed in units of 448 bits. The first packing data PD1 may be output in the valid period PD1_VALID of the first packing data PD1 and may be output every 4 cycles of the clock signal CLK. The last data of the first packing data PD1 may be output when the validity period PD1_VALID of the first packing data PD1 ends.

For example, the second line data LD2 may be packed in units of 448 bits. The second packing data PD2 may be output in the valid period PD2_VALID of the second packing data PD2 and may be output every 7 cycles of the clock signal CLK. The last data of the second packing data PD2 may be output when the validity period PD2_VALID of the second packing data PD2 ends.

An output period of the first packing data PD1 may be different from an output period of second packing data PD2, and the number of outputs of the first packing data PD1 may be different from the number of outputs of the second packing data PD2. Accordingly, arbitration of the first packing data PD1 and the second packing data PD2 may be made by using a round robin method. In addition, the line interleaving controller 100 may be efficiently used by adjusting a data size of packing data and the number of data packing circuits even when the number of channels connected to the line interleaving controller 100 is changed or conditions of line data provided by the channels are changed.

Figure 4:
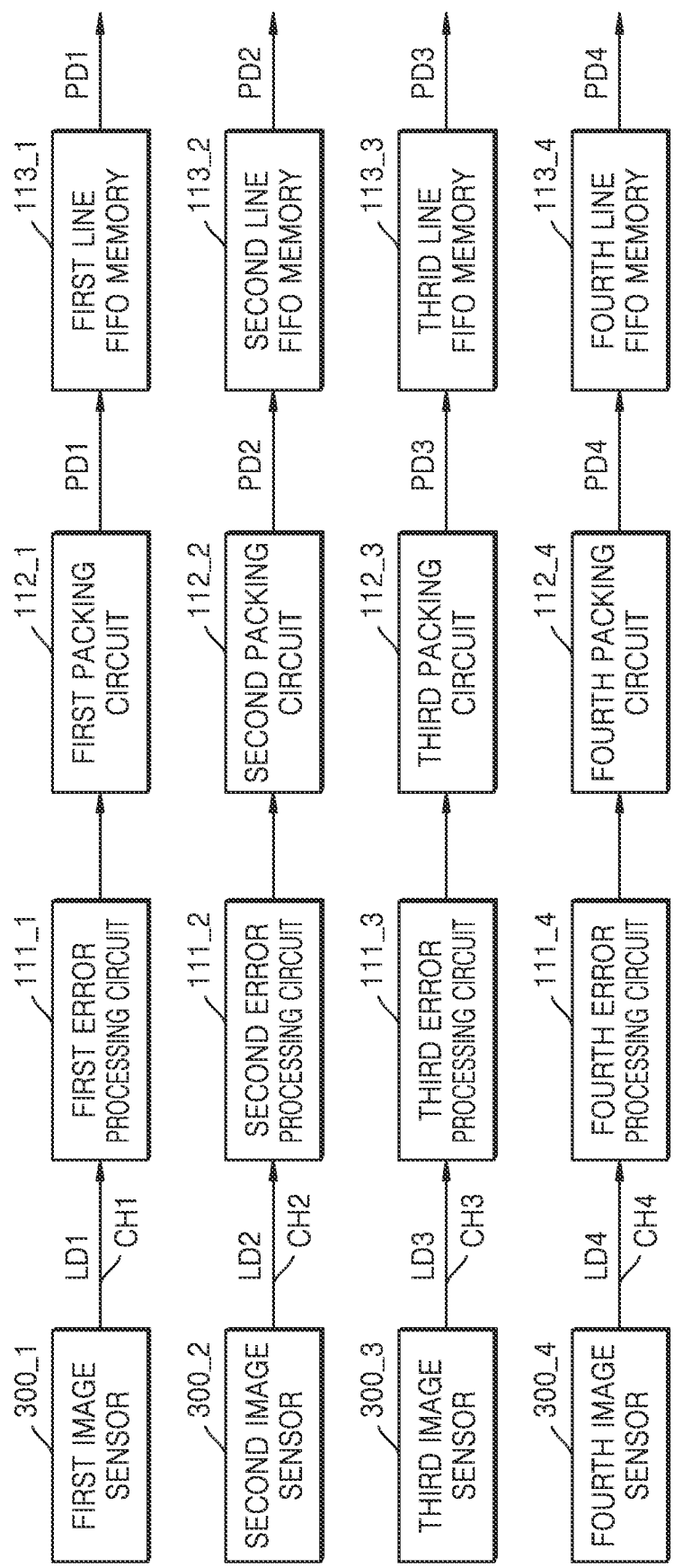
FIG. 4 is a diagram illustrating a configuration of a data packing circuit of a line interleaving controller according to an embodiment.

FIG. 4 is a diagram illustrating a configuration of a data packing circuit of a line interleaving controller according to an embodiment.

Referring to FIGS. 2 and 4, the first data packing circuit 110_1 may include a first error processing circuit 111_1 that detects a data error, a first packing circuit 112_1 that packs input data to a preset data size, and a first line FIFO memory 113_1 that stores packed first packing data. Each of the second data packing circuit 110_2 to the fourth data packing circuit 110_4 may include a corresponding error processing circuit among a second error processing circuit 111_2 to a fourth error processing circuit 111_4, a corresponding packing circuit among a second packing circuit 112_2 to a fourth packing circuit 112_4, and a corresponding line FIFO memory among a second line FIFO memory 113_2 to a fourth line FIFO memory 113_4.

The first error processing circuit 111_1 may perform operation for robust performance. The first error processing circuit 111_1 may receive the first line data LD1 and detect a data error of the first line data LD1. For example, the first error processing circuit 111_1 may detect a data overflow, a data size error, a frame data start time error, or data stuck and may detect a position (for example, a horizontal direction error or a vertical direction error) in which an error occurs. In addition, for example, the first error processing circuit 111_1 may generate a fake sync signal and provide the fake sync signal to the first packing circuit 112_1 when an interrupt occurs due to an error in at least one of the first line data LD1 to the fourth line data LD4 received through the first channel CH1 to the fourth channel CH4, and thus, it is possible to prevent problems from occurring even in operations of other circuits. The first error processing circuit 111_1 may also generate a test pattern signal.

The first packing circuit 112_1 may generate the first packing data PD1 by receiving line data from the first error processing circuit 111_1 and packing the line data to a preset data size. The first packing data PD1 may be stored in the first line FIFO memory 113_1 and may be output from the first line FIFO memory 113_1 according to an input order.

The description of the first error processing circuit 111_1 may be similarly applied to each of the second error processing circuit 111_2 to the fourth error processing circuit 111_4, the description of the first packing circuit 112_1 may be similarly applied to each of the second packing circuit 112_2 to the fourth packing circuit 112_4, and the description of the first line FIFO memory 113_1 may be similarly applied to each of the second line FIFO memory 113_2 to the fourth line FIFO memory 113_4.

Figure 5:
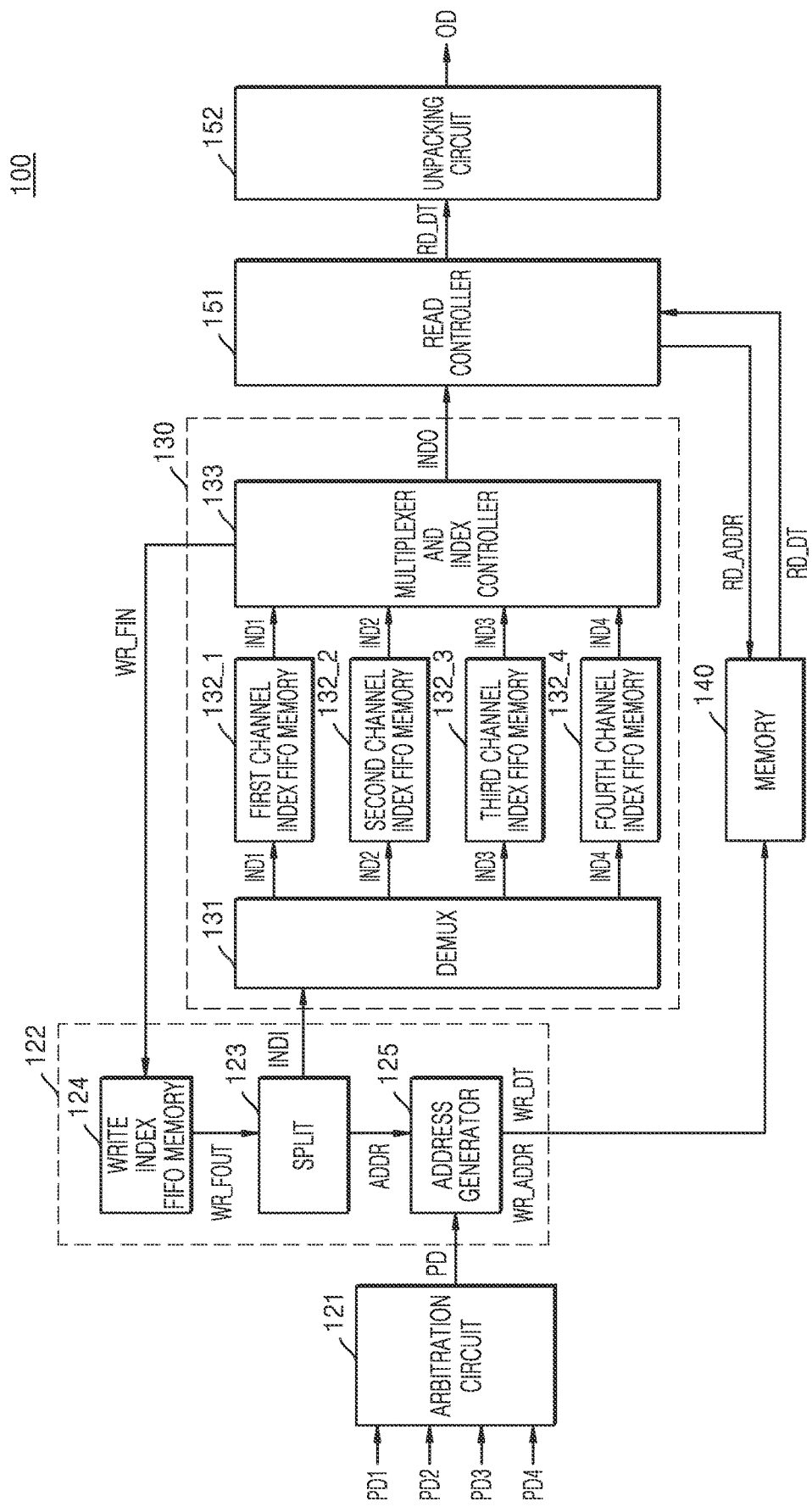
FIG. 5 is a block diagram illustrating a configuration of a line interleaving controller according to an embodiment.

FIG. 5 is a block diagram illustrating a configuration of the line interleaving controller 100 according to an embodiment. The line interleaving controller 100 of FIG. 5 is an example of the line interleaving controller of FIG. 2.

Referring to FIGS. 2 and 5, the line interleaving controller 100 may include an arbitration circuit 121, a write controller 122, the line index controller 130, the memory 140, a read controller 151, and an unpacking circuit 152. The line interleaving controller 100 may further include a plurality of data packing circuits.

The arbitration circuit 121 may receive the first packing data PD1 to the fourth packing data PD4 and sequentially output the first packing data PD1 to the fourth packing data PD4 as packing data PD. When simultaneously receiving two or more of the first packing data PD1 to the fourth packing data PD4, the arbitration circuit 121 may selectively receive data from among the two or more of the first packing data PD1 to the fourth packing data PD4 one by one and sequentially output the selected packing data.

The write controller 122 may include an address generator 125, a split circuit 123, and a write index FIFO memory 124. The address generator 125 may receive the packing data PD from the arbitration circuit 121, receive an address ADDR from the split circuit 123, and generate the write address WR_ADDR and the write data WR_DT. The address generator 125 may include a merge circuit.

The split circuit 123 may receive write index information WR_FOUT including vacancy index information and provide the line index controller 130 with the index information INDI about an index indicating a region where the packing data PD is stored, based on the write index information WR_FOUT. The split circuit 123 may generate the address ADDR corresponding to the index information INDI based on the write index information WR_FOUT.

The write index FIFO memory 124 may store index information about indexes indicating regions of the memory 140 to which data may be written, that is, empty index information. The write index FIFO memory 124 may receive index information WR_FIN about indexes for performing a read operation from the line index controller 130 and may update the empty index information. That is, the write index FIFO memory 124 may be updated when performing a write operation for the memory 140 and when performing a read operation for the memory 140.

The line index controller 130 may include a demultiplexer 131, a plurality of channel index FIFO memories (for example, a first channel index FIFO memory 132_1 to a fourth channel index FIFO memory 132_4), and a multiplexer and index controller 133. The demultiplexer 131 may receive the index information INDI from the write controller 122 and transmit the index information INDI to one of the first channel index FIFO memory 132_1 to the fourth channel index FIFO memory 132_4. For example, when the index information INDI corresponds to the first channel CH1, the index information INDI may be provided to the first channel index FIFO memory 132_1 as first index information INDI. Alternatively, for example, when the index information INDI corresponds to one of the second channel CH2 to the fourth channel CH4, one of second index information IND2 to fourth index information IND4 may be provided to a corresponding channel index FIFO memory among the second channel index FIFO memory 132_2 to the fourth channel index FIFO memory 132_4. Each of the first index information IND1 to the fourth index information IND4 may include index information about a region where packing data according to a corresponding channel among the first channel CH1 to the fourth channel CH4 is written to the memory 140.

The number of channel index FIFO memories included in the line index controller 130 may be equal to the number of channels connected to the line interleaving controller 100. When the number of channels connected to the line interleaving controller 100 is changed, the number of channel index FIFO memories included in the line index controller 130 may also be changed. The first channel index FIFO memory 132_1 may store index information indicating the memory 140 in which the first packing data PD1 received from the first channel CH1 is stored, the second channel index FIFO memory 132_2 may store index information indicating the memory 140 in which the second packing data PD2 received from the second channel CH2 is stored, the third channel index FIFO memory 132_3 may store index information indicating the memory 140 in which the third packing data PD3 received from the third channel CH3 is stored, and the fourth channel index FIFO memory 132_4 may store index information indicating the memory 140 in which the fourth packing data PD4 received from the fourth channel CH4 is stored. That is, each of the first channel index FIFO memory 132_1 to the fourth channel index FIFO memory 132_4 may store information about indexes assigned to the first channel CH1 to the fourth channel CH4.

The multiplexer and index controller 133 may receive the first index information IND1 to the fourth index information IND4 respectively from the first channel index FIFO memory 132_1 to the fourth channel index FIFO memory 132_4. The multiplexer and index controller 133 may provide the read controller 151 with the index information INDO about an index corresponding to a channel from which image data input is completed among the first channel CH1 to the fourth channel CHn. For example, when image data is input to the third channel CH3, the multiplexer and index controller 133 may provide the read controller 151 with the third index information IND3 received from the third channel index FIFO memory 132_3 as the index information INDO.

The multiplexer and index controller 133 may transmit the index information WR_FIN about indexes for performing a read operation to the write controller 122. The index information WR_FIN about indexes for performing a read operation may include the same information as the index information INDO about indexes corresponding to the channels from which image data input is completed. For example, the multiplexer and index controller 133 may store "1" for indexes indicating the data written to the memory 140 and "0" for indexes (that is, empty indexes) indicating the data read from the memory 140.

The read controller 151 may provide the read address RD_ADDR to the memory 140 based on the index information INDO and may receive the read data RD_DT from the memory 140. The unpacking circuit may unpack the read data RD_DT such that the output data OD has each of the same data format as the first line data LD1 to the fourth line data LD4 and output the unpacked read data RD_DT as the output data OD.

Figure 6:
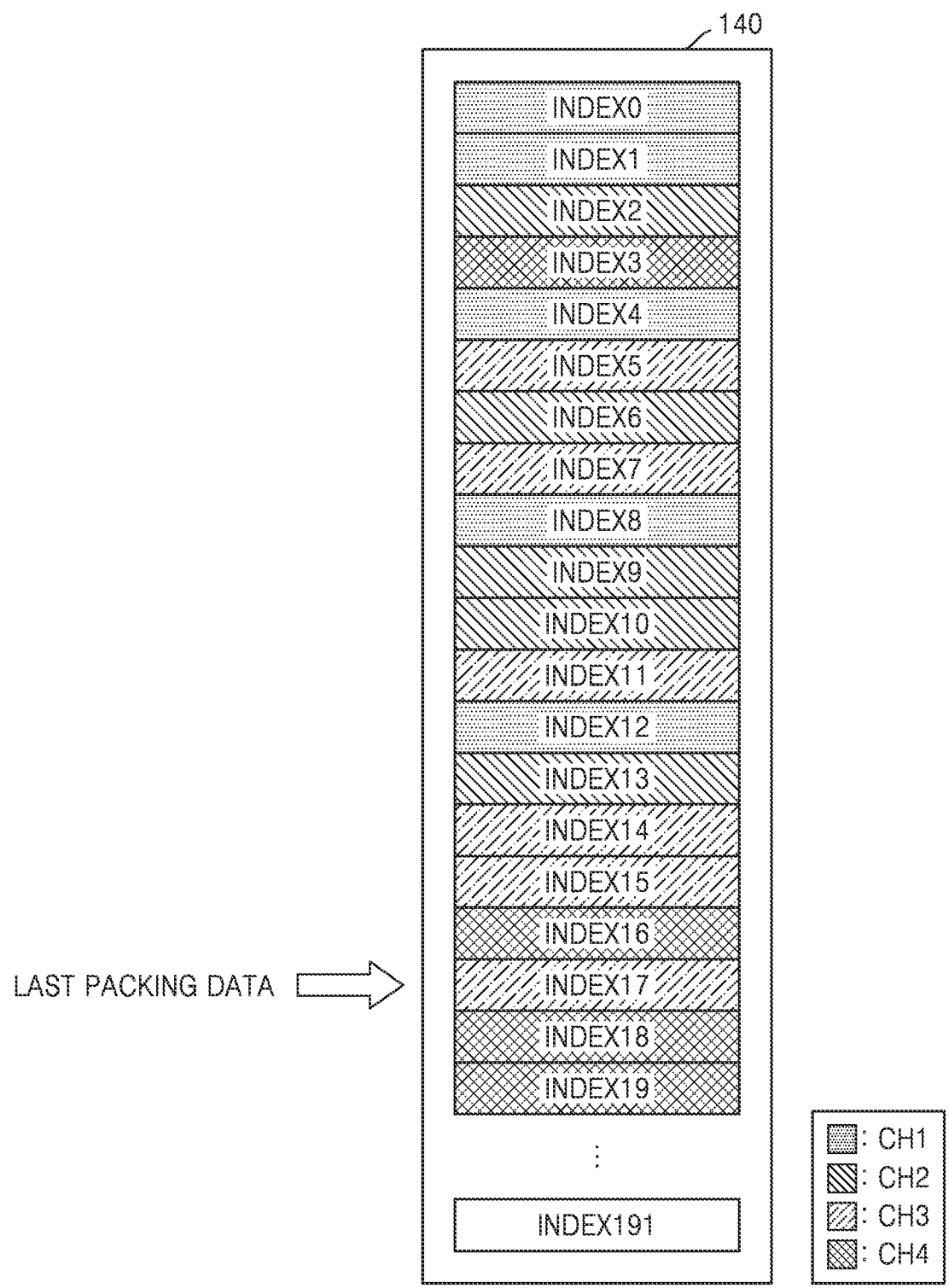
FIG. 6 is a diagram illustrating a memory of a line interleaving controller according to an embodiment.
Figure 7:
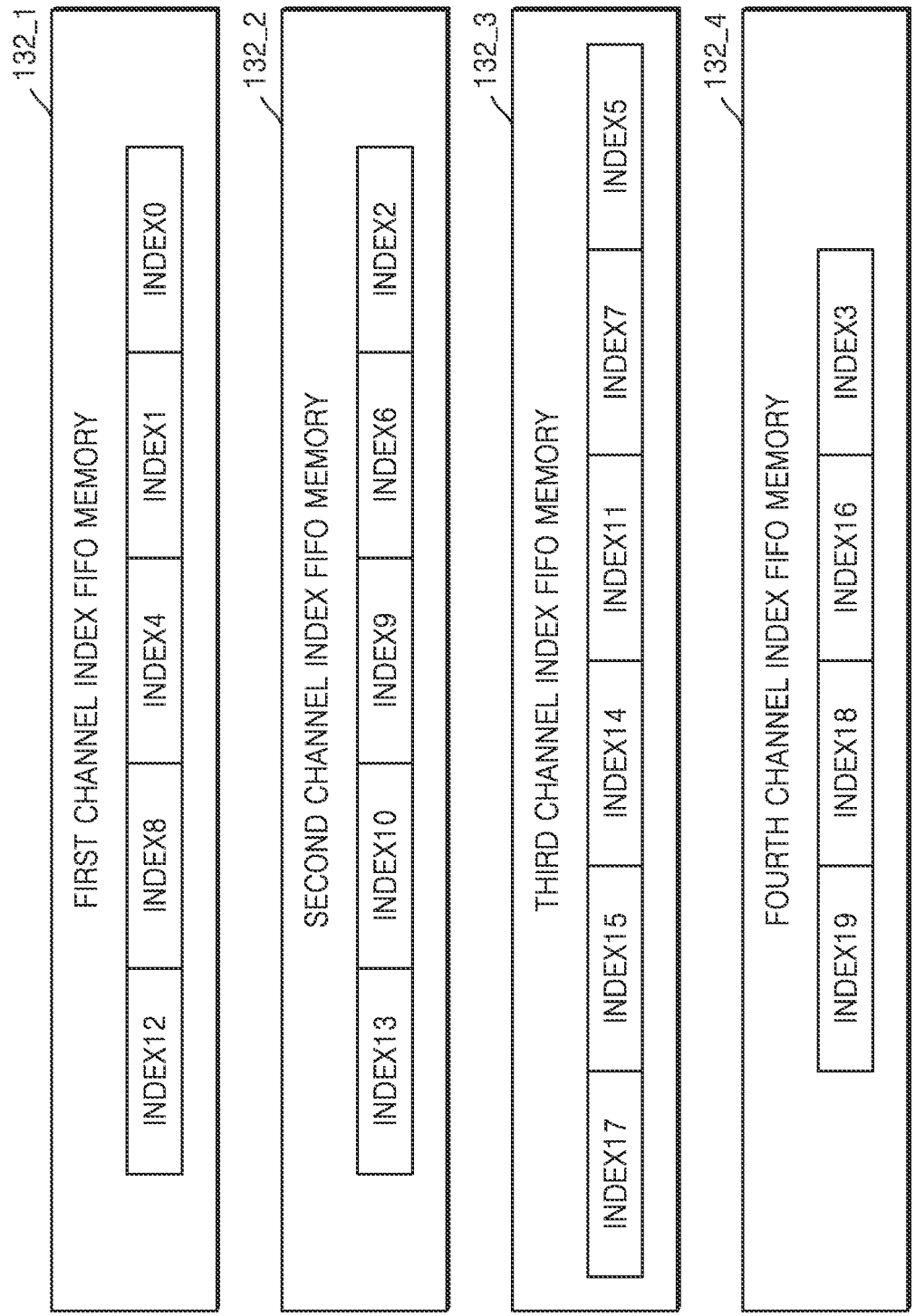
FIG. 7 is a diagram illustrating index information stored in a plurality of channel index first in first out (FIFO) memories according to packing data written to a memory.

FIG. 6 is a diagram illustrating a write operation of the memory 140 of the line interleaving controller 100 according to an embodiment. FIG. 7 is a diagram illustrating index information stored in a plurality of channel index FIFO memories according to packing data written to the memory 140.

Referring to FIGS. 5, 6, and 7, regions of the memory 140 may be classified into a plurality of indexes. For example, 192 indexes (for example, INDEX0 to INDEX191) may be allocated in the memory 140, but this is an example, and the number of indexes is not limited thereto. In this case, a data size of the index may be a multiple of the data size of the packing data, for example, 8 times or 16 times. For example, when the data size of the packing data is 448 bits, the data size of the index may be 3584 bits, which is 8 times 448 bits.

The first index INDEX0, the second index INDEX1, the fifth index INDEX4, the ninth index INDEX8, and the thirteenth index INDEX12 may be assigned to the first channel CH1. That is, the first packing data PD1, in which the first line data provided from the first channel CH1 is packed, may be stored in regions respectively indicated by the first index INDEX0, the second index INDEX1, the fifth index INDEX4, the ninth index INDEX8, and the thirteenth index INDEX12. Accordingly, index information about the first index INDEX0, the second index INDEX1, the fifth index INDEX4, the ninth index INDEX8, and the thirteenth index INDEX12 may be stored in the first channel index FIFO memory 132_1.

The third index INDEX2, the seventh index INDEX6, the tenth index INDEX9, the eleventh index INDEX10, and the fourteenth index INDEX13 may be assigned to the second channel CH2. That is, the second packing data PD2, in which the second line data provided from the second channel CH2 is packed, may be stored in regions respectively indicated by the third index INDEX2, the seventh index INDEX6, the tenth index INDEX9, the eleventh index INDEX10, and the fourteenth index INDEX13. Accordingly, index information about the third index INDEX2, the seventh index INDEX6, the tenth index INDEX9, the eleventh index INDEX10, and the fourteenth index INDEX13 may be stored in the second channel index FIFO memory 132_2.

The sixth index INDEX5, the eighth index INDEX7, the twelfth index INDEX11, the fifteenth index INDEX14, the sixteenth index INDEX15, and the eighteenth index INDEX17 may be assigned to the third channel CH3. That is, the third packing data PD3, in which the third line data provided from the third channel CH3 is packed, may be stored in regions respectively indicated by the sixth index INDEX5, the eighth index INDEX7, the twelfth index INDEX11, the fifteenth index INDEX14, the sixteenth index INDEX15, and the eighteenth index INDEX17. Accordingly, index information about the sixth index INDEX5, the eighth index INDEX7, the twelfth index INDEX11, the fifteenth index INDEX14, the sixteenth index INDEX15, and the eighteenth index INDEX17 may be stored in the third channel index FIFO memory 132_3.

The fourth index INDEX3, the seventeenth index INDEX16, the nineteenth index INDEX18, and the twelfth index INDEX19 may be assigned to the fourth channel CH4. That is, the fourth packing data PD4, in which the fourth line data provided from the fourth channel CH4 is packed, may be stored in regions respectively indicated by the fourth index INDEX3, the seventeenth index INDEX16, the nineteenth index INDEX18, and the twelfth index INDEX19. Accordingly, index information about the fourth index INDEX3, the seventeenth index INDEX16, the nineteenth index INDEX18, and the twelfth index INDEX19 may be stored in the fourth channel index FIFO memory 132_4.

In this case, image data input to the third channel CH3 may be completed first. The third packing data PD3 written to the region indicated by the eighteenth index INDEX17 may be the last packing data of the third packing data PD3. Accordingly, the third packing data PD3 corresponding to the third channel CH3 may be all read from the memory 140.

Figure 8:
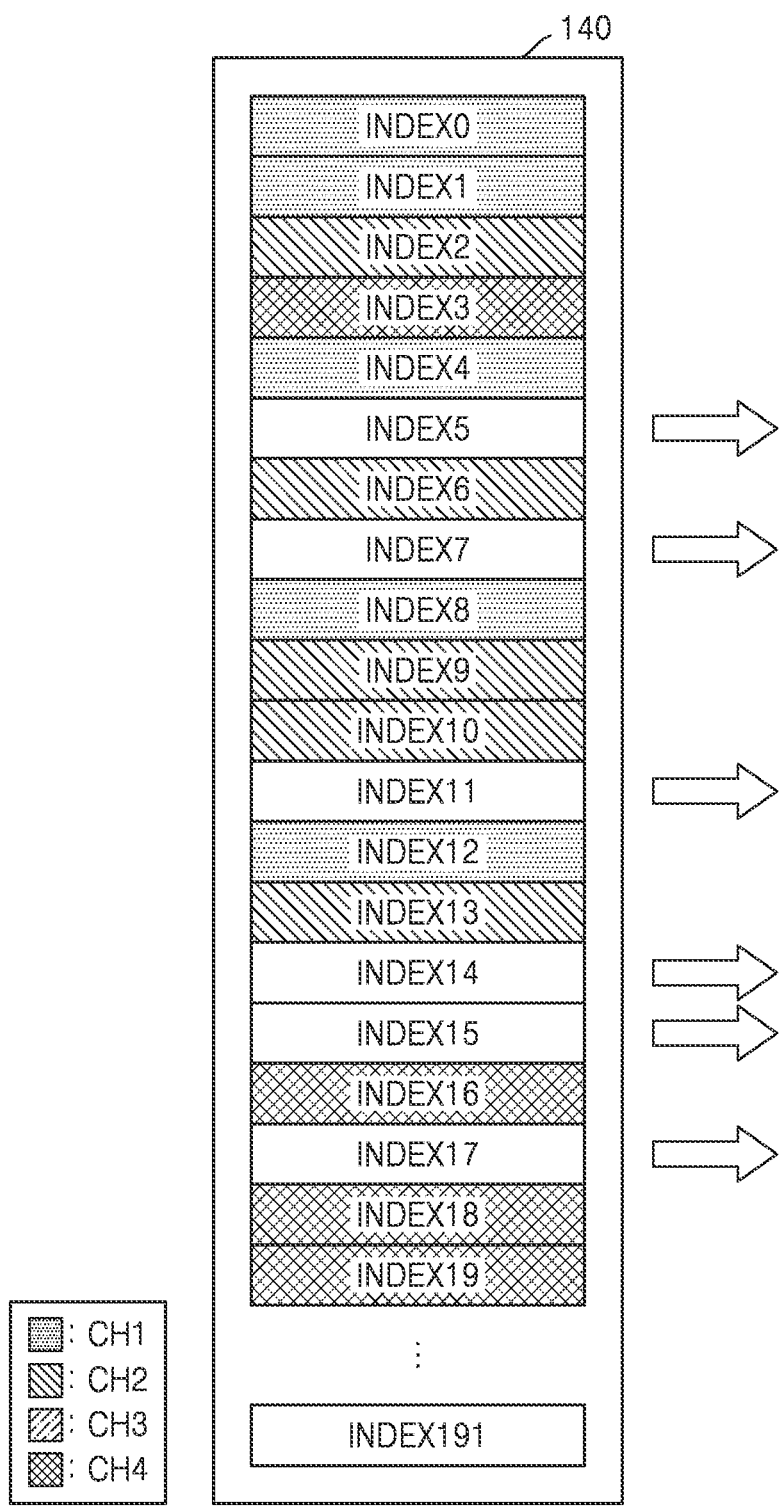
FIG. 8 is a diagram illustrating a memory of a line interleaving controller according to an embodiment.
Figure 9:
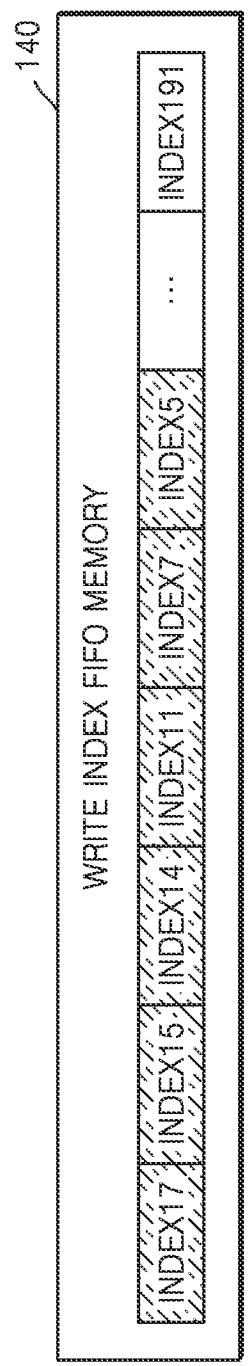
FIG. 9 is a diagram illustrating index information stored in a write index FIFO memory according to packing data read from a memory.

FIG. 8 is a diagram illustrating a read operation of the memory 140 of the line interleaving controller 100 according to an embodiment. FIG. 9 is a diagram illustrating index information stored in a write index FIFO memory according to packing data read from the memory 140.

Referring to FIGS. 5, 8, and 9, image data input from the third channel CH3 among the first channel CH1 to the fourth channel CH4 is completed first. The third packing data PD3 written to the region indicated by the eighteenth index INDEX17 may be the last packing data, and the third packing data PD3 corresponding to the third channel CH3 may all be read from the regions of the memory 140 which are indicated by the sixth index INDEX5, the eighth index INDEX7, the twelfth index INDEX11, the fifteenth index INDEX14, the sixteenth index INDEX15, and the eighteenth index INDEX17.

New packing data may be written to the regions indicated by the sixth index INDEX5, the eighth index INDEX7, the twelfth index INDEX11, the fifteenth index INDEX14, the sixteenth index INDEX15, and the eighteenth index INDEX17, and accordingly, the sixth index INDEX5, the eighth index INDEX7, the twelfth index INDEX11, the fifteenth index INDEX14, the sixteenth index INDEX15, and the eighteenth index INDEX17 may be classified as empty indexes. Index information about the sixth index INDEX5, the eighth index INDEX7, the twelfth index INDEX11, the fifteenth index INDEX14, the sixteenth index INDEX15, and the eighteenth index INDEX17 may be newly stored and updated in the write index FIFO memory 140. The write controller may store new packing data in the regions indicated by the sixth index INDEX5, the eighth index INDEX7, the twelfth index INDEX11, the fifteenth index INDEX14, the sixteenth index INDEX15, and the eighteenth index INDEX17 based on the sixth index INDEX5, the eighth index INDEX7, the twelfth index INDEX11, the fifteenth index INDEX14, the sixteenth index INDEX15, and the eighteenth index INDEX17 stored in the write index FIFO memory 140. The line interleaving controller 100 according to embodiments preferentially outputs image data input to a channel from which image data input is completed first, and thus, the memory 140 may be efficiently used.

In this case, index information about the sixth index INDEX5, the eighth index INDEX7, the twelfth index INDEX11, the fifteenth index INDEX14, the sixteenth index INDEX15, and the eighteenth index INDEX17 stored in the third channel index FIFO memory 132_3 of FIG. 7 may be removed.

Figure 10:
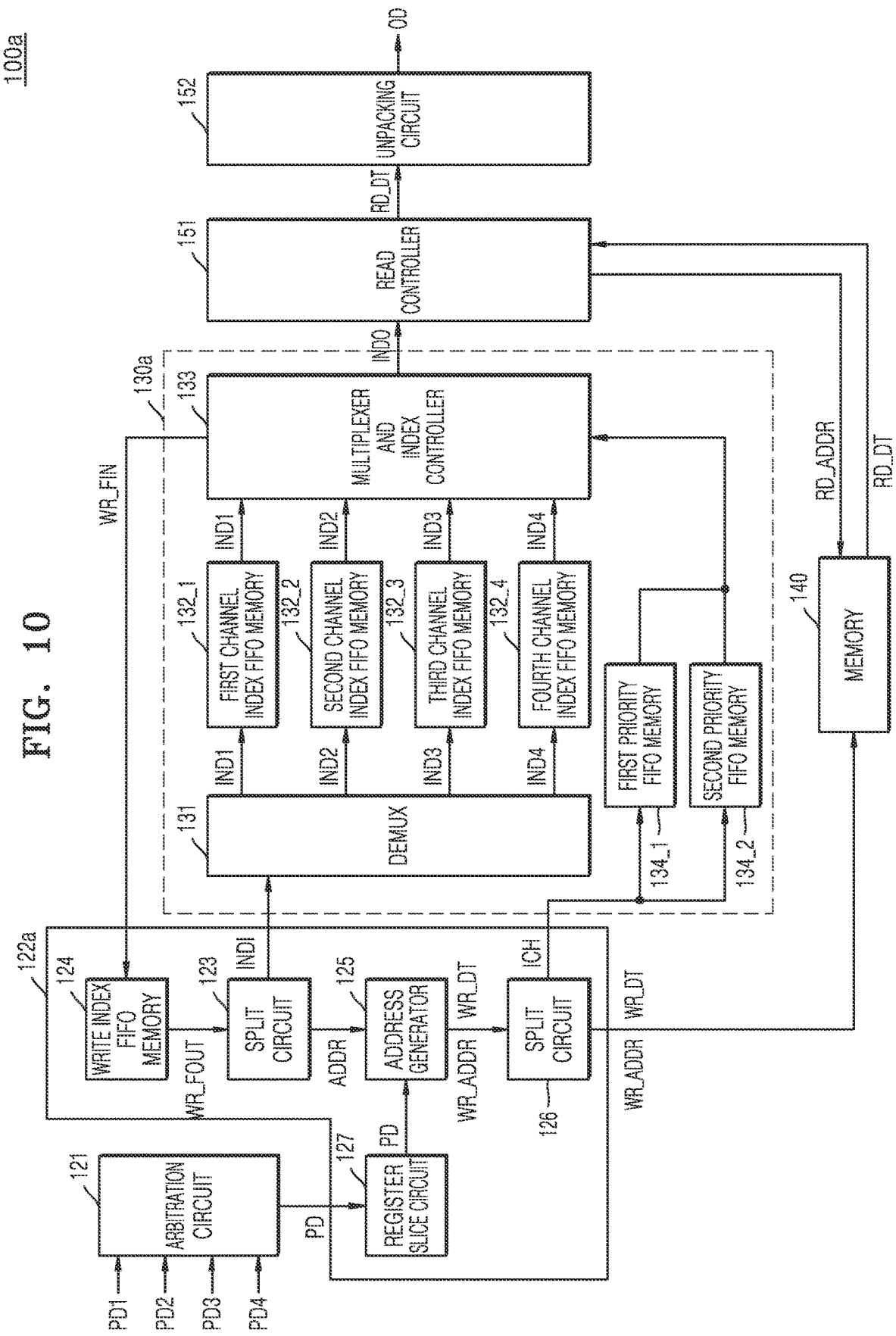
FIG. 10 is a block diagram illustrating a configuration of a line interleaving controller according to an embodiment.

FIG. 10 is a block diagram illustrating a configuration of a line interleaving controller 100a according to an embodiment. The line interleaving controller 100a of FIG. 10 is an example of the line interleaving controller 100 of FIG. 2. Redundant descriptions of reference numerals previously given with reference to FIG. 5 are omitted.

Referring to FIGS. 2 and 10, the line interleaving controller 100a may include an arbitration circuit 121, a write controller 122a, a line index controller 130a, a memory 140, a read controller 151, and an unpacking circuit 152. The line interleaving controller 100a may further include a plurality of data packing circuits.

The write controller 122a may include an address generator 125, split circuits 123 and 126, a write index FIFO memory 124, and a register slice circuit 127. The register slice circuit 127 may receive packing data PD from the arbitration circuit 121 and transmit the packing data to the address generator 125.

The split circuit 126 may receive a write address WR_ADDR and write data WR_DT from the address generator 125, and provide the line index controller 130a with channel information ICH indicating a channel that transmits image data when the write data WR_DT is the last packing data of the image data. That is, the split circuit 126 may output the channel information ICH indicating a channel from which line data input is completed. The split circuit 126 may transmit the write address WR_ADDR and the write data WR_DT to the memory 140.

The line index controller 130a may include at least one priority memory that stores priority information about a plurality of channels (for example, the first channel CH1 to the fourth channel CH4) according to the channel information ICH received from the write controller 122a. For example, the line index controller 130a may include a first priority FIFO memory 134_1 and a second priority FIFO memory 134_2. The first priority FIFO memory 134_1 may store information indicating a channel having a relatively high data processing priority, and the second priority FIFO memory 134_2 may store information indicating a channel having a relatively low data processing priority. Although only the first priority FIFO memory 134_1 and the second priority FIFO memory 134_2 are illustrated in FIG. 10, embodiments are not limited thereto, and the line index controller 130a may include one priority FIFO memory, and may include three or more priority FIFO memories.

For example, line data input from both the third channel CH3 and the second channel CH2 may be completed, and in this case, a processing priority of the third channel CH3 may be higher than a processing priority of the second channel CH2. Information indicating the third channel CH3 may be stored in the first priority FIFO memory 134_1 according to the channel information ICH of the third channel CH3, and information indicating the second channel CH2 may be stored in the second priority FIFO memory 134_2 according to the channel information ICH of the second channel CH2.

A multiplexer and index controller 133 may provide index information INDO to the read controller 151 to read packing data of a channel corresponding to the first priority FIFO memory 134_1 earlier than packing data of a channel corresponding to the second priority FIFO memory 134_2. For example, when information indicating the third channel CH3 is stored in the first priority FIFO memory 134_1 and information indicating the second channel CH2 is stored in the second priority FIFO memory 134_2, the multiplexer and index controller 133 may provide the index information INDO to the read controller 151 to preferentially read the packing data of the third channel CH3 from the memory 140. Accordingly, the line interleaving controller 100a may output the output data OD corresponding to the third line data provided through the third channel CH3 and then output the output data OD corresponding to the second line data provided through the second channel CH2.

Figure 11:
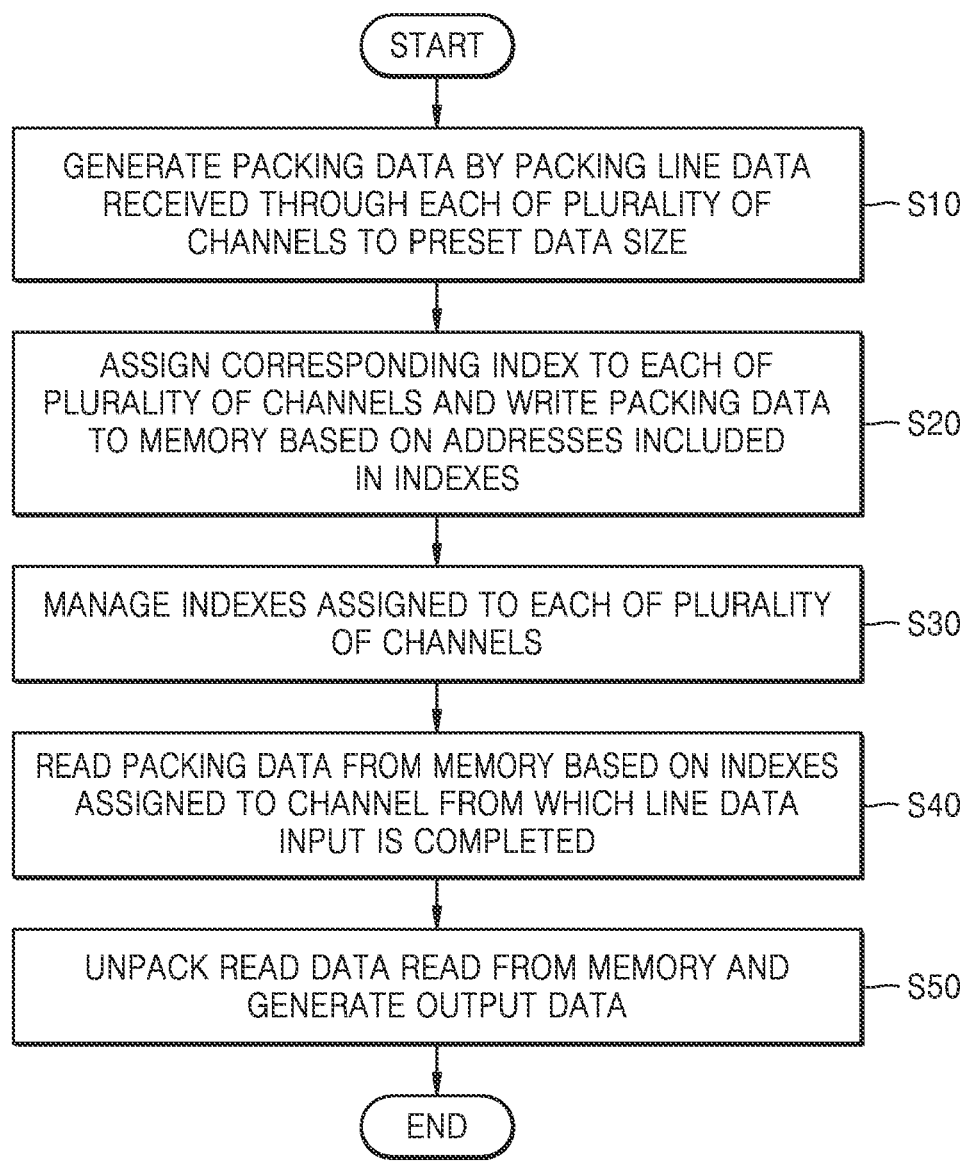
FIGS. 11 to 13 are flowcharts illustrating an operating method of an image processing apparatus, according to an embodiment.
Figure 12:
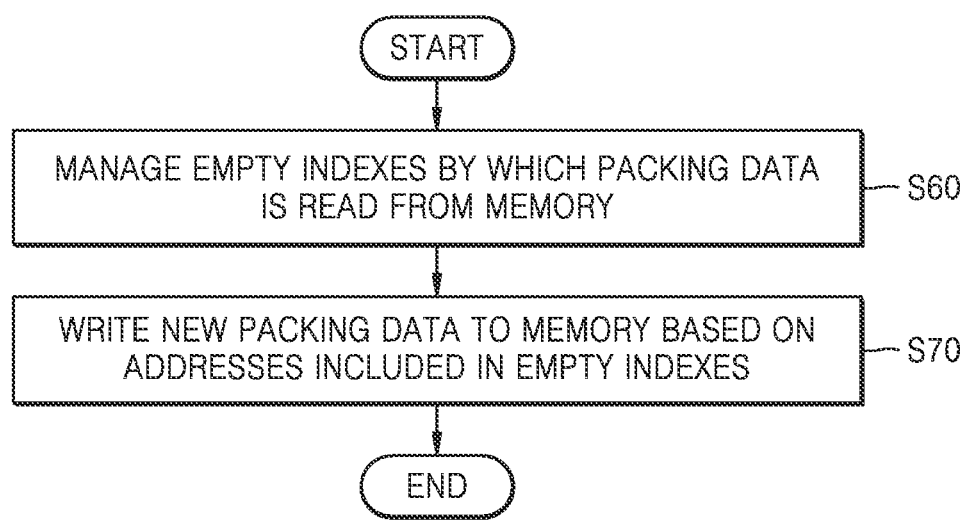
Figure 13:
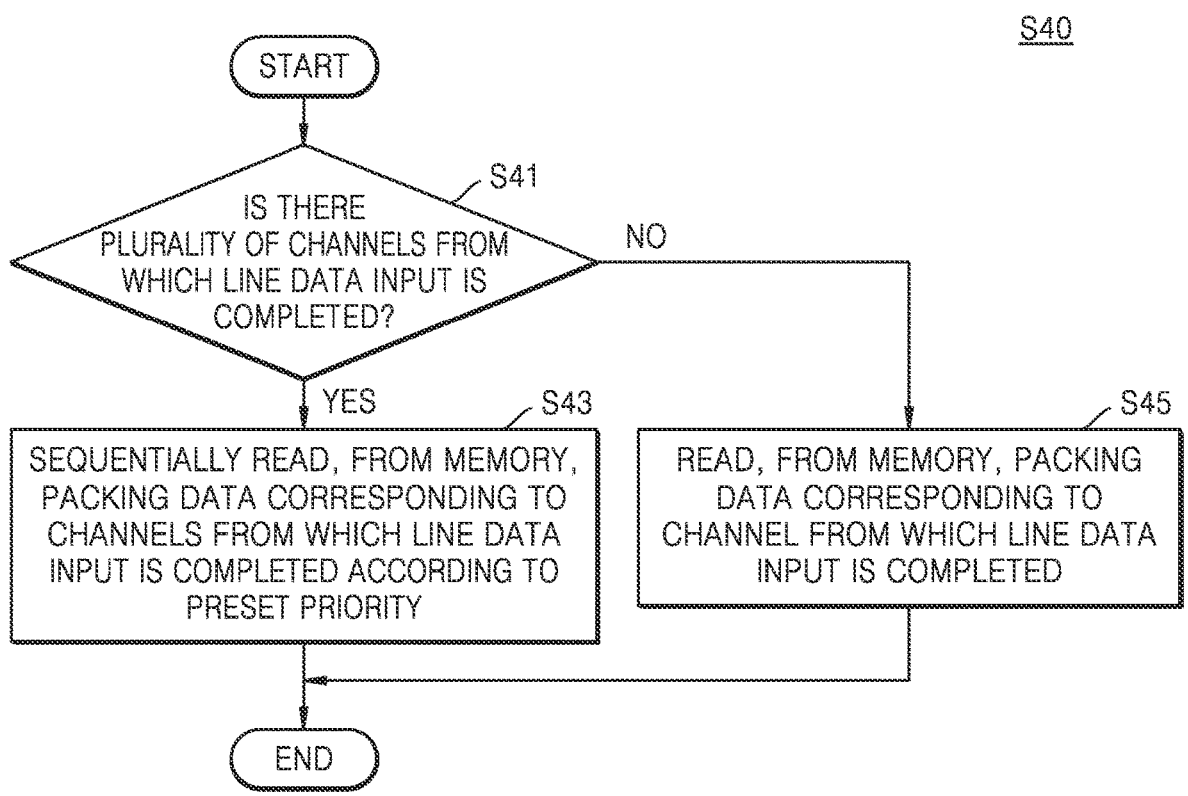

FIGS. 11 to 13 are flowcharts illustrating an operating method of an image processing apparatus, according to an embodiment. Operation S40 of FIG. 13 may be an example of operation S40 of FIG. 11 and may include operation S41 to operation S43.

Referring to FIG. 11, an image processing apparatus may generate packing data by packing line data received through each of a plurality of channels to a preset data size in operation S10. In this case, the data size may be determined according to the number of channels connected to a line interleaving controller and the number of maximum bits received during one cycle of a clock signal for different line data received from the plurality of channels. In addition, the data size may be determined according to PPC of each of the plurality of channels.

In an embodiment, the image processing apparatus may receive first line data from a first image sensor through a first channel among the plurality of channels and may receive second line data from a second image sensor through a second channel among the plurality of channels. Alternatively, in an embodiment, the image processing apparatus may receive the first line data from an image sensor through the first channel among the plurality of channels and may also receive the second line data from a direct memory access controller through the second channel among a plurality of channels. The direct memory access controller is described below with reference to FIG. 14.

In operation S20, the image processing apparatus may assign a corresponding index to each of the plurality of channels and write packing data to a memory included in the image processing apparatus based on addresses included in the index. Each of the addresses may correspond to packing data, and a data size of the index may be a multiple (for example, 8 times) of a data size of the packing data. Accordingly, one index may correspond to a plurality of addresses.

The image processing apparatus may manage indexes assigned to each of the plurality of channels in operation S30. For example, the image processing apparatus may include a first memory (for example, the first channel index FIFO memory 132_1 of FIG. 5) for managing first indexes assigned to a first channel among the plurality of channels and a second memory (for example, the second channel index FIFO memory 132_2 of FIG. 5) for managing second indexes assigned to a second channel among the plurality of channels.

In operation S40, the image processing apparatus may read packing data from the memory based on the indexes assigned to a channel from which line data input is completed. For example, when line data input from the first channel among the plurality of channels is completed, packing data corresponding to the first channel may be read from the memory based on the indexes assigned to the first channel.

In operation S50, the image processing apparatus may unpack the read data read from the memory and generate output data. The image processing apparatus may generate the output data by unpacking the read data to have the same data format as the line data.

Referring to FIG. 12, in operation S60, the image processing apparatus may manage empty indexes by which packing data is read from the memory. Operation S60 may be performed after operation S40 of FIG. 11. Empty indexes may indicate regions of the memory to which packing data may be written. The image processing apparatus may further include a memory for managing the empty indexes by which packing data may be written.

In operation S70, the image processing apparatus may write new packing data to the memory based on addresses included in the empty indexes. The packing data written to the memory is managed in units of index, and indexes corresponding to each of the channels are managed, and thus, the capacity of an internal memory (for example, an SRAM) for storing the packing data may be efficiently used, and a line interleaving controller may be implemented to include a memory with a relatively small capacity.

Referring to FIG. 13, in operation S41, the image processing apparatus may determine whether there are a plurality of channels from which line data input is completed. When the number of channels from which line data input is completed is singular (S41, NO), packing data corresponding to the channel from which line data input is completed may be read from the memory in operation S45.

When there are a plurality of channels from which line data input is completed (S41, YES), packing data corresponding to each of the plurality of channels from which the line data input is completed may be sequentially read from the memory according to a preset priority in operation S43. For example, when line data input from the first channel and the second channel among the plurality of channels are completed, packing data corresponding to the first channel having a relatively high priority may be read first, and then packing data corresponding to the second channel may be read.

Figure 14:
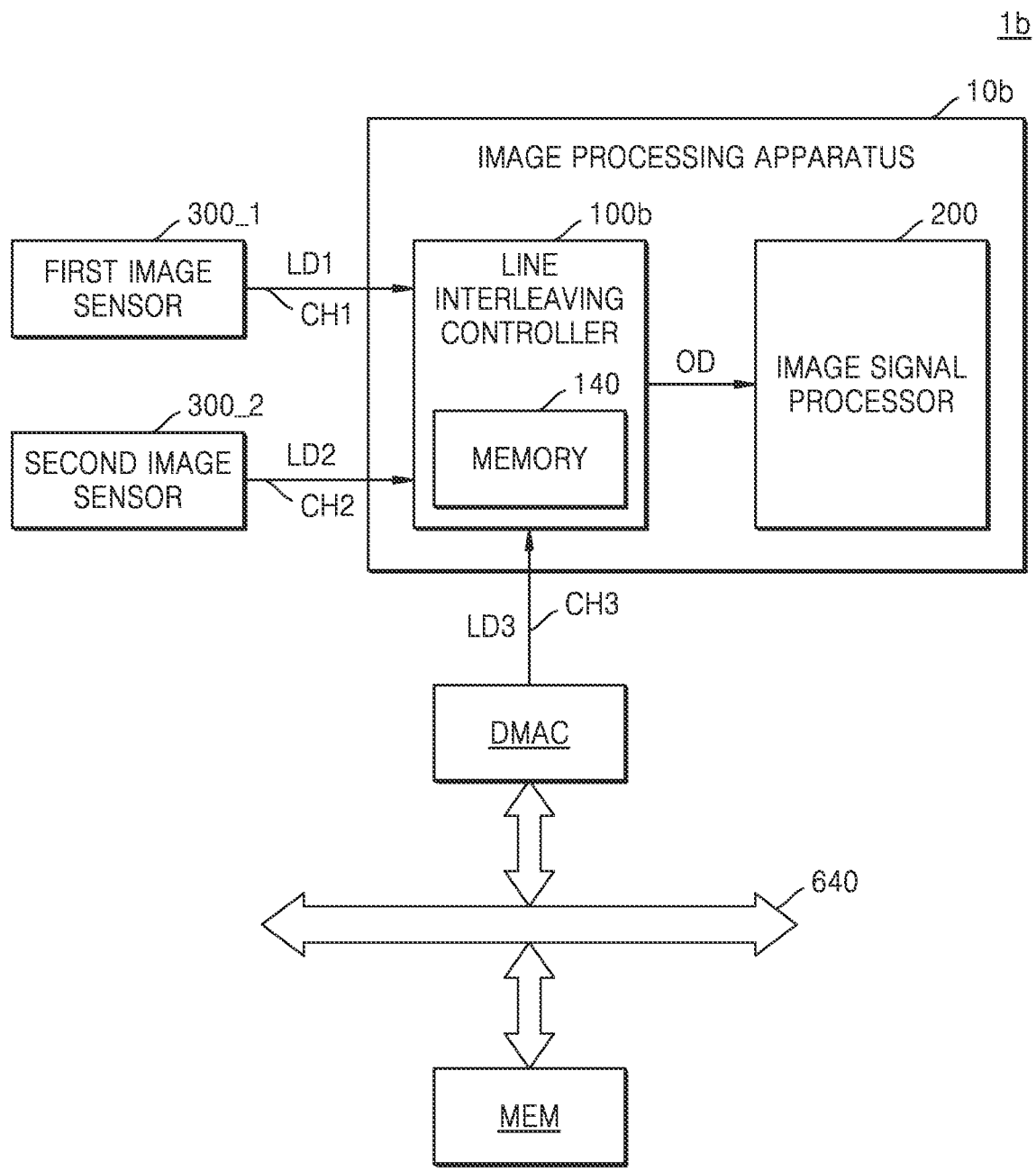
FIG. 14 is a block diagram illustrating an image processing system according to an embodiment.

FIG. 14 is a block diagram illustrating an image processing system 1b according to an embodiment.

Referring to FIG. 14, the image processing system 1b may include a plurality of image sensors (for example, a first image sensor 300_1 and a second image sensor 300_2), an image processing apparatus 10b, a direct memory access controller DMAC, and a memory device MEM. The direct memory access controller DMAC may access the memory device MEM through a bus 640. In an embodiment, the memory device MEM may be a dynamic random access memory (DRAM) but embodiments are not limited thereto. A configuration and operation of a line interleaving controller 100b may be the same as the configuration and the operation of the line interleaving controller 100 or 100a described with reference to FIGS. 1 to 13.

The line interleaving controller 100b may receive first line data LD1 from the first image sensor 300_1 through a first channel CH1, receive second line data LD2 from the second image sensor 300_2 through a second channel CH2 and receive third line data LD3 from the direct memory access controller DMAC through a third channel CH3. The direct memory access controller DMAC may generate the third line data LD3 by reading frame data stored in the memory device MEM. Accordingly, the first channel CH1 and the second channel CH2 may provide the line interleaving controller 100b with the first line data LD1 and the second line data LD2 processed on-the-fly, and the third channel CH3 may have a relatively low processing priority compared to the first channel CH1 and the second channel CH2.

Accordingly, when line data input from the first channel CH1 or the second channel CH2 is completed and also line data input from the third channel CH3 is completed, the line interleaving controller 100b may first read packing data corresponding to the first channel CH1 or the second channel CH2 from the memory 140, and then read packing data corresponding to the third channel CH3 from the memory 140. For example, the line interleaving controller 100b may include a first priority FIFO memory (for example, 134_1 of FIG. 10) and a second priority FIFO memory (for example, 134_2 of FIG. 10), The first priority FIFO memory 134_1 may store information indicating the first channel CH1 or the second channel CH2 having a relatively high data processing priority among channels from which line data input is completed, and the second priority FIFO memory 134_2 may store information indicating the third channel CH3 having a relatively low data processing priority among the channels from which line data input is completed.

In some embodiments, each of the components represented by a block, such as those illustrated in FIGS. 1, 2, 4, 5, 10 and 14 may be implemented as various numbers of hardware, software and/or firmware structures that execute respective functions described above, according to embodiments. For example, at least one of these components may include various hardware components including a digital circuit, a programmable or non-programmable logic device or array, an application specific integrated circuit (ASIC), transistors, capacitors, logic gates, or other circuitry using use a direct circuit structure, such as a memory, a processor, a logic circuit, a look-up table, etc., that may execute the respective functions through controls of one or more microprocessors or other control apparatuses. Also, at least one of these components may include a module, a program, or a part of code, which contains one or more executable instructions for performing specified logic functions, and executed by one or more microprocessors or other control apparatuses. Also, at least one of these components may further include or may be implemented by a processor such as a central processing unit (CPU) that performs the respective functions, a microprocessor, or the like. Functional aspects of example embodiments may be implemented in algorithms that execute on one or more processors. Furthermore, the components, elements, modules or units represented by a block or processing operations may employ any number of related art techniques for electronics configuration, signal processing and/or control, data processing and the like.

While aspects of embodiments have been particularly shown and described, it will be understood that various changes in form and details may be made therein without departing from the spirit and scope of the following claims.

What is claimed is:

1. An image processing apparatus comprising:
a line interleaving controller configured to generate output data based on line data received from a plurality of channels respectively connected to a plurality of image sensors; and
an image signal processor configured to process the output data,
wherein the line interleaving controller comprises:

a plurality of data packing circuits respectively corresponding to the plurality of channels and configured to generate packing data by packing the line data to a preset data size;

a memory configured to store the packing data in a region indicated by an index assigned to a corresponding channel among the plurality of channels;

a write controller configured to control a write operation of the memory;

a line index controller configured to manage indexes respectively corresponding to the plurality of channels;

a read controller configured to control a read operation of the memory; and an unpacking circuit configured to unpack read data output from the read controller.

2. The image processing apparatus of claim 1, wherein the line interleaving controller is further configured to determine a data size based on a number of the plurality of channels connected to the line interleaving controller and a maximum number of bits received during one cycle of a clock signal for different pieces of line data respectively received from the plurality of channels, and set the data size as the preset data size.

3. The image processing apparatus of claim 1, wherein each of the plurality of data packing circuits comprises:
an error processing circuit configured to detect a data error;
a packing circuit configured to pack input data to the preset data size; and
a first-in first-out (FIFO) memory configured to store packed packing data.

4. The image processing apparatus of claim 1, wherein the write index memory is configured to receive information indicating indexes corresponding to packing data read from the memory and store the information as the information indicating empty indexes.

5. The image processing apparatus of claim 1, wherein the line index controller comprises:
a first channel index memory configured to store first index information indicating the memory storing first packing data corresponding to a first channel among the plurality of channels;
a second channel index memory configured to store second index information indicating the memory storing second packing data corresponding to a second channel among the plurality of channels; and
an index controller configured to acquire the first index information from the first channel index memory and the second index information from the second channel index memory, and provide information indicating empty indexes to the write controller.

6. The image processing apparatus of claim 1, wherein a data size of the index is a multiple of the preset data size.

7. The image processing apparatus of claim 1, wherein the line index controller comprises at least one priority memory configured to store priority information about the plurality of channels, and provide index information to the read controller, and
wherein the read controller is further configured to read packing data of a selected channel among the plurality of channels from the memory according to the priority information.

8. The image processing apparatus of claim 7, wherein the line index controller includes a first priority memory and a second priority memory, each configured to store information indicating a channel from which the line data input is completed, and provide the index information to the read controller, and
wherein the read controller is further configured to, based on the index information, read packing data of a channel corresponding to the first priority memory earlier than packing data of a channel corresponding to the second priority memory.

9. An image processing apparatus comprising:
a first data packing circuit configured to generate first packing data by packing first line data corresponding to a first channel to a preset data size;
a second data packing circuit configured to generate second packing data by packing second line data corresponding to a second channel to the preset data size;
an arbitration circuit configured to receive the first packing data and the second packing data and sequentially output the first packing data and the second packing data;
a memory configured to store the first packing data and the second packing data;
a line index controller configured to manage a first index for a first region in the memory in which the first packing data is stored and manage a second index for a second region in the memory in which the second packing data is stored;
a write controller configured to control a write operation of the memory;
a read controller configured to control a read operation of the memory; and
an unpacking circuit configured to generate output data by unpacking read data output from the read controller.

10. The image processing apparatus of claim 9, wherein the first channel is connected to an image sensor, and the second channel is connected to a direct memory access controller.

11. The image processing apparatus of claim 9, wherein the first channel and the second channel are respectively connected to different image sensors.

12. The image processing apparatus of claim 9, wherein the write controller comprises:
a write index memory configured to store information indicating empty indexes; and
an address generator configured to generate a write address according to the information indicating the empty indexes.

13. The image processing apparatus of claim 9, wherein the line index controller comprises:
a first channel index memory configured to store first index information indicating the memory storing the first packing data;
a second channel index memory configured to store second index information indicating the memory storing the second packing data; and
an index controller configured to acquire the first index information from the first channel index memory and the second index information from the second channel index memory, and provide information indicating empty indexes to the write controller.

14. The image processing apparatus of claim 9, wherein the memory comprises a static random-access memory (SRAM).

15. The image processing apparatus of claim 9, wherein the line index controller comprises at least one priority memory configured to store priority information about the first channel and the second channel, and provide index information to the read controller, and wherein the read controller is further configured to read packing data of a selected one of the first channel and the second channel from the memory according to the priority information.

16. The image processing apparatus of claim 15, wherein the line index controller comprises a first priority memory and a second priority memory, each configured to store information indicating a channel from which the line data input is completed, and provide the index information to the read controller, and wherein the read controller is further configured to read, based on the index information, packing data of a channel corresponding to the first priority memory earlier than packing data of a channel corresponding to the second priority memory.

17. An operating method of an image processing apparatus including a line interleaving controller, the operating method comprising:

generating packing data by packing line data received through each of a plurality of channels to a preset data size;

assigning indexes respectively corresponding the plurality of channels, and writing the packing data to a memory of the line interleaving controller based on addresses included in the assigned indexes;

reading packing data corresponding to a channel from which line data input is completed from the memory, based on indexes assigned to the channel from which the line data input is completed; and generating output data by unpacking read data read from the memory.

18. The operating method of claim 17, further comprising:

managing empty indexes by which the packing data is read from the memory; and writing new packing data to the memory, based on addresses included in the empty indexes.

19. The operating method of claim 17, wherein the reading the packing data from the memory comprises sequentially reading, from the memory, packing data corresponding to each of two of the plurality of channels from which the line data input is completed according to a set priority based on the line data input for the two of the plurality of channels being completed.

20. The operating method of claim 17, wherein the generating the output data comprises unpacking the read data to a same data format as the line data.

* * * * *